United States Patent [19]
Wagner

[11] Patent Number: 5,330,014
[45] Date of Patent: Jul. 19, 1994

[54] POWER WINCH-ICE AUGER CONVERSION APPARATUS

[76] Inventor: David A. Wagner, 1000 3rd St. S., Cold Spring, Minn. 56320

[21] Appl. No.: 100,361

[22] Filed: Aug. 2, 1993

[51] Int. Cl.⁵ ........................... B25F 3/00; F25C 5/04
[52] U.S. Cl. ...................................... 175/18; 30/122; 173/29
[58] Field of Search ................ 175/18, 87; 173/27, 173/29; 30/122

[56] References Cited

U.S. PATENT DOCUMENTS

| | | | |
|---|---|---|---|
| 2,975,848 | 3/1961 | Roberts | 173/216 |
| 3,705,632 | 12/1972 | Burke | 173/27 |
| 4,872,518 | 10/1989 | Crippin | 175/18 |
| 4,971,161 | 11/1990 | Godell | 175/18 |
| 5,038,870 | 8/1991 | Kuronen | 175/18 |

Primary Examiner—David J. Bagnell
Attorney, Agent, or Firm—Rhodes & Ascolillo

[57] ABSTRACT

An ice auger conversion apparatus has an ice auger support and steering mounting member and a winch connected to the ice auger support and steering mounting member. A ring conversion member detachably connects to the winch. A winch drive motor connects to a driven end of the winch. A winch drive socket conversion member connects to a driving end of the winch. One end of a drive conversion adapter member removingly connects to the winch drive socket and another end of the drive conversion adapter member removingly connects to an ice auger shaft member. An ice auger removably connects to the ice auger shaft member. The ice auger support and steering member also has a mounting plate attached to the winch and a steering handle member attached to the mounting plate. A power circuit attaches to the steering handle member to provide power to the winch drive motor. The power circuit has a power circuit actuation switch and a power source. The ice auger has a replaceable blade insert that detachably connects to a distal end of the ice auger shaft member.

5 Claims, 2 Drawing Sheets

POWER WINCH-ICE AUGER CONVERSION APPARATUS

BACKGROUND OF THE INVENTION

1. Field of the Invention

This invention relates generally to an ice auger and more particularly to a power winch, ice auger conversion apparatus. This conversion apparatus allows a power boat or trailer winch to be used to drive an ice auger used to penetrate an ice layer to allow fishing through the ice.

2. Description of the Related Art

Ice augers have been used by fishermen and others to penetrate a layer of ice to either fish or to enter the water below for study. Previously, the augering operations has been a strenuous task. Other related art devices have tried to make the augering operation easier by adapting various motive sources to the auger. depending on the equipment available and the location, these devices have had varying degrees of success.

U.S. Pat. No. 3,705,632 to L. J. Burke on Dec. 12, 1972 for a Portable Electric Ice Auger describes a portable electric ice auger that is connected to the battery of a snowmobile.

U.S. Pat. No. 4,872,518 to A. C. Crippin on Oct. 10, 1989 for a Power Chainsaw—Ice Auger Conversion Apparatus shows a conversion apparatus to adapt a chainsaw to an ice auger by means of a geared drive train.

U.S. Pat. No. 4,971,161 to R. P. Godell on Nov. 20, 1990 for an Ice Auger Conversion Kit describes a kit for adapting a grass trimming machine to provide power to an ice auger by means of a gear train.

U.S. Pat. No. 5,038,870 to L. J. Kuronen on Aug. 13, 1991 for an Ice Auger Cutter shows a hand operated ice auger having an adjustable stop for limiting the rate of penetration of the cutting elements.

Since many ice fishers and others involved around and in the water usually have access to boats and boat trailers, they often have power winches available to them. The present invention thus becomes a valuable option to them. It allows them to utilize a piece of equipment in an entirely novel and useful manner.

SUMMARY OF THE INVENTION

Ice fishing is a popular winter sport in many parts of the country. Cutting a hole in the ice with a hand auger is a slow and tedious process. The present invention provides an apparatus to allow a power boat or boat trailer or similar winch to be adapted to power an ice auger. It converts a hand operated auger into a power auger.

The present invention can, along with equivilent power winches, utilize a 12 Volt X-1 "SUPER-WINCH" as a drive means. A screw point auger and a detachable ice auger insert can be used. The present invention is easy to assemble. The ice auger insert is placed on the screw point auger. The winch is attached to the adapter plate by fastening means such as the nuts and bolts shown in FIG. 2, the end of the auger is inserted into the socket in the winch and held in place by a locking pin or equivilent locking device. The power auger can then be operated by grasping the handle, positioning the point of the auger on the selected point on the ice and turning on the switch to provide power to the winch motor.

In one combination embodiment, an ice auger conversion apparatus is shown and described that has a winch with a winch drive motor connected to a driven end of the winch. A winch drive socket conversion member is connected to a driving end of the winch. One end of a drive conversion adapter member removingly connects to the winch drive socket and another end of the drive conversion adapter member removingly connects to an ice auger shaft member.

In another combination embodiment, an ice auger conversion apparatus has an ice auger support and steering mounting member and a winch connected to the ice auger support and steering mounting member. There is a winch drive motor connected to a driven end of the winch and a winch drive socket conversion member connected to a driving end of the winch. One end of a drive conversion adapter member removingly connects to the winch drive socket and another end of the drive conversion adapter member removingly connects to an ice auger shaft member.

It is an object of this invention to provide an apparatus to adapt a power winch assembly to an ice auger to provide motive force to the auger in order to cut a hole in an ice layer.

DESCRIPTION OF THE PREFERRED EMBODIMENTS

Figure 1:
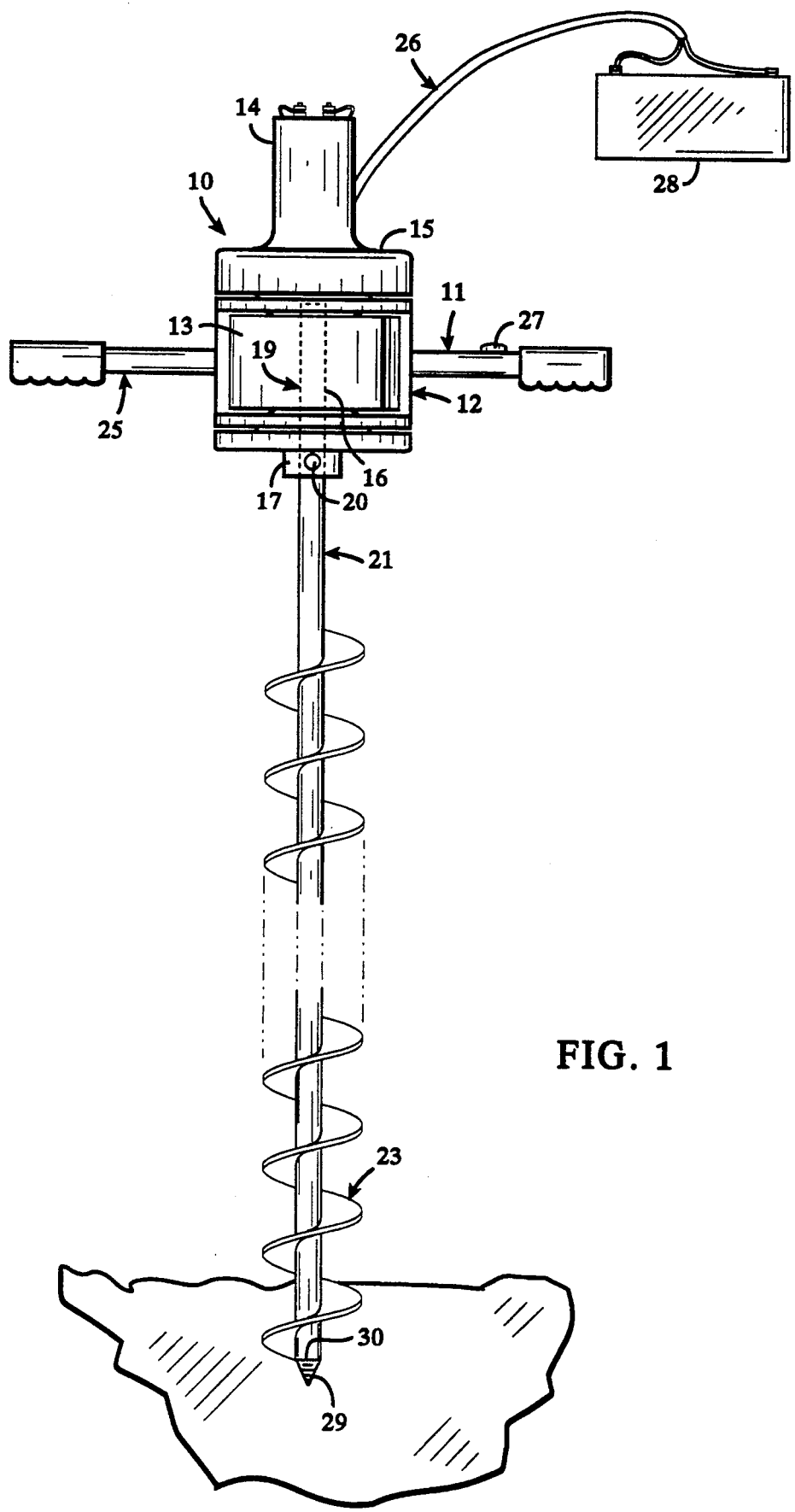
FIG. 1 is a front elevational view of a Power Winch—Ice auger Conversion Apparatus shown with the an ice auger shaft member in a partial front elevational view. The auger is shown about to enter the partial view of a ice surface.
Figure 2:
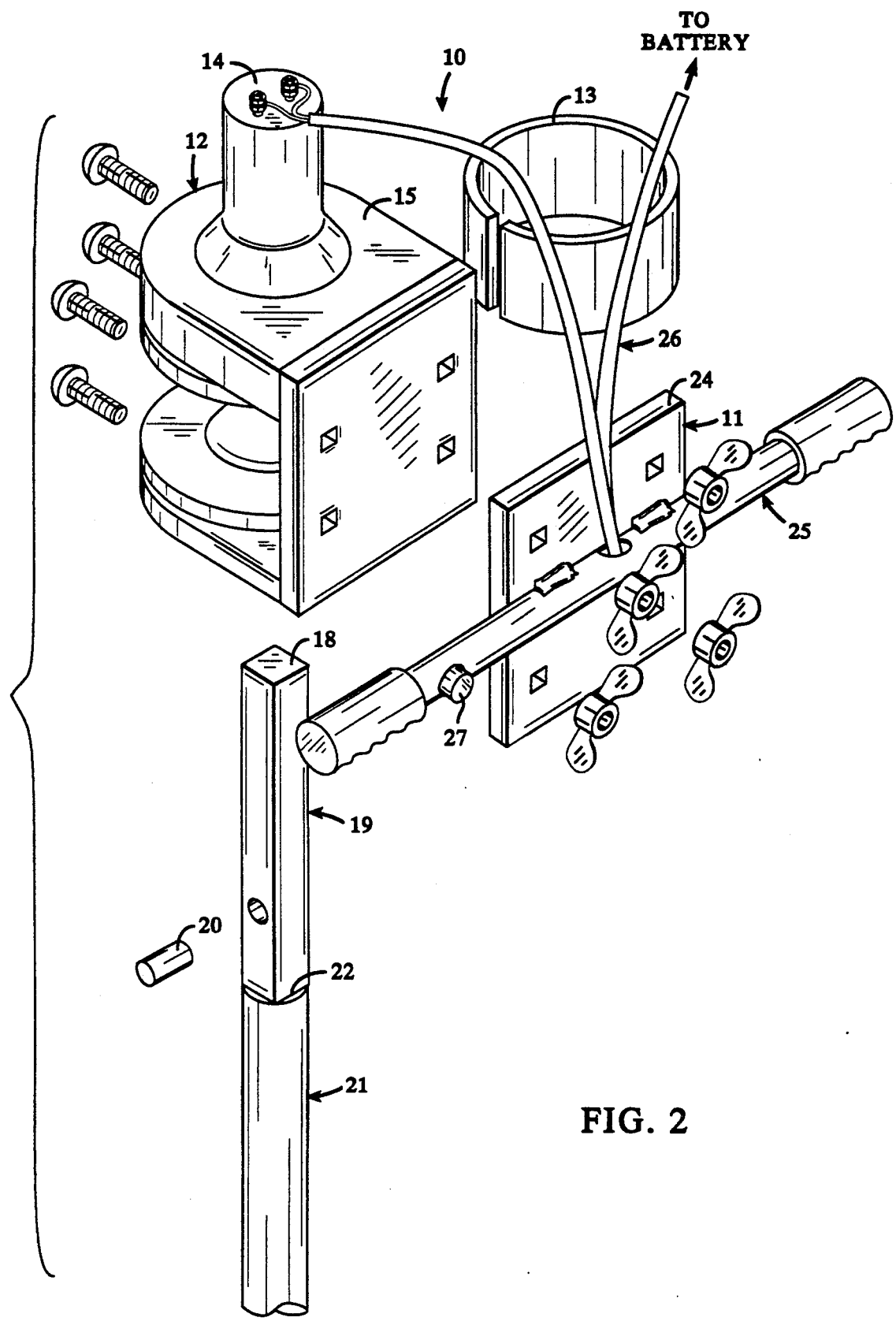
FIG. 2 is a perspective view of the Power Winch—Ice auger Conversion Apparatus. The drive conversion adapter member is shown in a partial perspective view.

Referring to FIGS. 1 and 2, an ice auger conversion apparatus 10 is shown having an ice auger support and steering mounting member 11. There is a winch 12 connected to the ice auger support and steering mounting member 11. A ring conversion member 13 detachably connected to the winch 12. A winch drive motor 14 connects to a driven end 15 of the winch 12. There is a winch drive socket 16 connected to a driving end 17 of the winch 12. One end 18 of a winch drive socket conversion member 19 removingly connects to the winch drive socket 16. The winch drive socket conversion member 19 has a locking member 20 attached thereto that releasingly locks the winch drive socket conversion member 19 to an ice auger shaft member 21. Another end 22 of the winch drive conversion member 19 is removingly connected to the ice auger shaft member 21. There is an ice auger 23 removably connected to the ice auger shaft member 21.

The ice auger support and steering mounting member 11 further has a mounting plate 24 attached to the winch 12. There is a steering handle member 25 attached to the mounting plate 24 and a power circuit 26 attached to the steering handle member 25 to provide power to the winch drive motor 14. There is a power circuit actuation switch 27 in the power circuit 26 and a power source 28 (such as a DC Voltage Battery) in the power circuit 26. The ice auger 23 further comprises a replaceable blade insert 29 detachably connected to a distal end 30 of the ice auger shaft member 21.

The foregoing descriptions and drawings of the invention are explanatory and illustrative only, and various changes in shape, sizes and arrangements of parts as well certain details of the illustrated construction may be made within the scope of the appended claims without departing from the true spirit of the invention.

I claim:

1. An ice auger conversion apparatus comprising, in combination:
   (a) a winch;
   (b) a winch drive motor connected to a driven end of the winch;
   (c) a winch drive socket conversion member connected to a driving end of the winch;
   (d) one end of a drive conversion adapter member removingly connected to the winch drive socket; and
   (e) another end of the drive conversion adapter member removingly connected to an ice auger shaft member.

2. An ice auger conversion apparatus comprising, in combination:
   (a) an ice auger support and steering mounting member;
   (b) a winch connected to the ice auger support and steering mounting member;
   (c) a winch drive motor connected to a driven end of the winch;
   (d) a winch drive socket conversion member connected to a driving end of the winch;
   (e) one end of a drive conversion adapter member removingly connected to the winch drive socket; and
   (f) another end of the drive conversion adapter member removingly connected to an ice auger shaft member.

3. An ice auger conversion apparatus comprising, in combination:
   (a) an ice auger support and steering mounting member;
   (b) a winch connected to the ice auger support and steering mounting member;
   (c) a ring conversion member detachably connected to the winch;
   (d) a winch drive motor connected to a driven end of the winch;
   (e) a winch drive socket connected to a driving end of the winch;
   (f) one end of a drive conversion adapter member removingly connected to the winch drive socket;
   (g) another end of the drive conversion adapter member removingly connected to an ice auger shaft member; and
   (h) an ice auger removably connected to the ice auger shaft member.

4. An ice auger conversion apparatus as described in claim 3 wherein the ice auger support and steering mounting member further comprises:
   (a) a mounting plate attached to the winch;
   (b) a steering handle member attached to the mounting plate;
   (c) a power circuit attached to the steering handle member to provide power to the winch drive motor;
   (d) a power circuit actuation switch in the power circuit; and
   (e) a power source in the power circuit.

5. An ice auger conversion apparatus as described in claim 3 wherein the ice auger further comprises a replaceable blade insert detachably connected to a distal end of the ice auger.

* * * * *